United States Patent

Thomas

[15] 3,647,323
[45] Mar. 7, 1972

[54] BATTERY OPERATED FANNING DEVICE

[72] Inventor: John C. Thomas, 451 Queensboro Lane, Haddonfield, N.J. 08033

[22] Filed: Aug. 28, 1970

[21] Appl. No.: 67,716

[52] U.S. Cl. ............................ 417/234, 417/411, 126/25 B, 415/219 B
[51] Int. Cl. ............... F04b 21/00, F04b 17/00, F04b 35/04, A47j 37/00
[58] Field of Search .................... 417/234, 411; 416/170; 126/25 B, 15 A, 21 A; 415/219 B

[56] References Cited

UNITED STATES PATENTS

| | | | |
|---|---|---|---|
| 3,099,386 | 7/1963 | Pieper | 417/411 X |
| 3,347,220 | 10/1967 | Barbera, Sr. | 126/25 B X |
| 2,950,669 | 8/1960 | Terry | 126/25 B X |

*Primary Examiner*—Robert M. Walker

[57] ABSTRACT

A battery-operated fanning device which can be used in cooperation with barbecues and the like in order to produce a rapid expansion of zone of ignited coals therein. The device includes dry cell batteries in a housing having a fan and exhaust nozzle fastened thereto. A retainer is provided for mounting the device on a barbecue pit.

5 Claims, 6 Drawing Figures

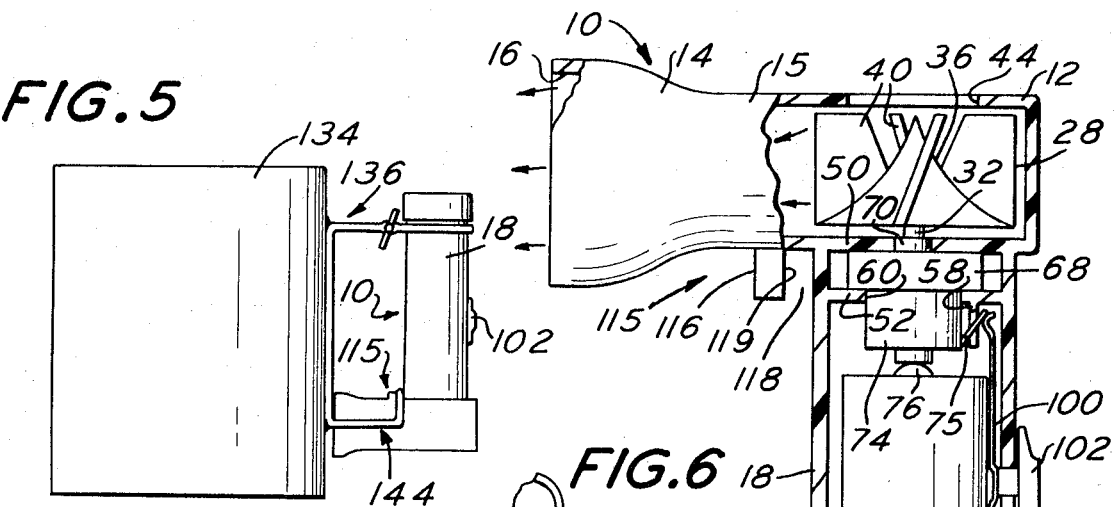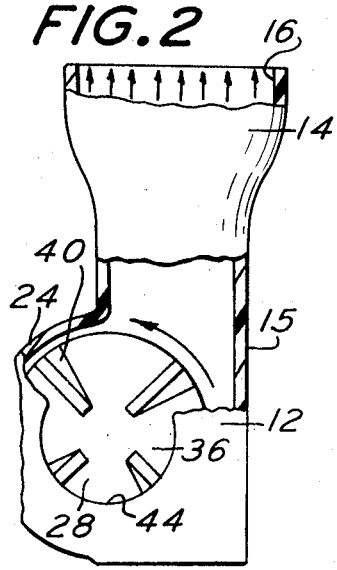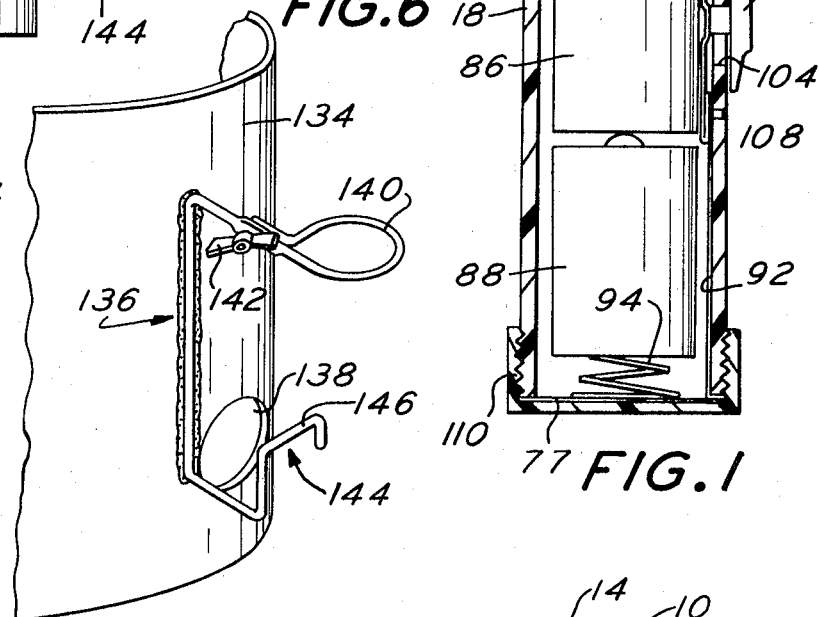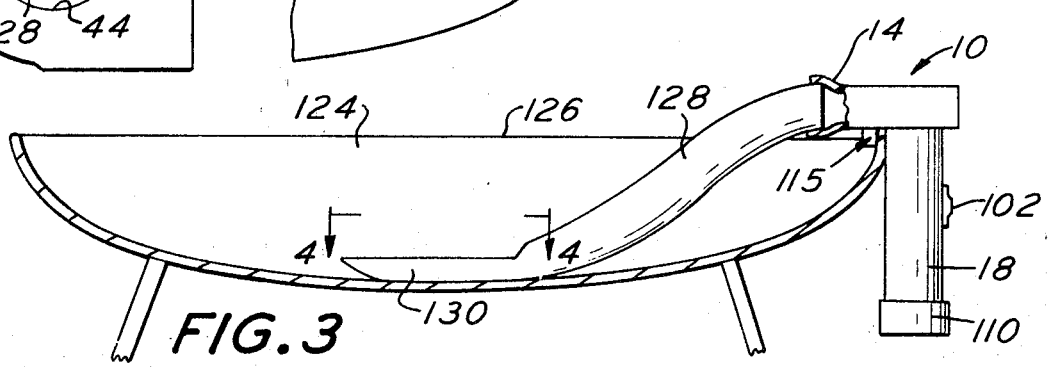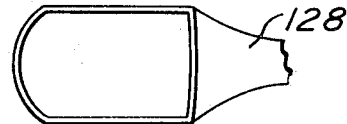
INVENTOR
JOHN C. THOMAS
BY
Seidel, Gonda & Goldhammer
ATTORNEYS

BATTERY OPERATED FANNING DEVICE

This invention relates to devices for fanning fires in barbecues and more particularly to a battery-operated device which can be mounted on a barbecue pit and fan the fire from beneath.

As is well known, barbecue fires are often created by charcoal-type briquettes which are ignited after they are first treated with a suitable starting material. Invariably the briquettes start to burn in a small area. Although the briquettes burn at a temperature of approximately 500° it may take a substantial amount of time, on the order of about a half-hour, before the entire bed of briquettes is ignited and the barbecue cooking can commence.

Often, this delay between the ignition of the briquettes and the burning of the entire bed can be reduced by fanning the fire. This causes the coals to burn much more intensely and consequently to ignite adjacent briquettes. However, short of actually fanning the fire with a hand-operated fan or by blowing at the fire, there has been no practical, convenient and portable fanning device which can be taken on picnics or other excursions where its presence would be helpful.

Accordingly, it is an object of this invention to provide a novel and unobvious battery-operated device for fanning a barbecue fire.

It is another object of this invention to provide a barbecue fire fanning device which is relatively convenient to use and which has retaining means thereon that cooperates with a barbecue pit so that the device becomes self-supporting thereon.

It is still another object of this invention to provide a barbecue fire fanning device which may cooperate with a barbecue pit to form a handle therefor.

Generally, the invention relates to a battery-operated device for fanning a fire from beneath. The device includes a first housing with an inlet and an outlet. A centrifugal fan is supported by the housing so that air may be driven through the outlet. A battery housing is connected to the first housing and a motor is supported by the battery housing for driving the fan.

Other objects and advantages of the subject invention will be apparent from a detailed description of a presently preferred form of the invention which is described herein wherein:

FIG. 1 is a side view, partially in section, of a device constructed in accordance with a presently preferred form of the invention.

FIG. 2 is a top view, partially in section, of the device illustrated in FIG. 1.

FIG. 3 is a view of the device supported on a shallow barbecue pit.

FIG. 4 is a sectional view taken along line 4—4 of FIG. 3.

FIG. 5 is a side view of the device shown in cooperation with a deep barbecue pit.

FIG. 6 is a perspective view of the barbecue pit shown in FIG. 5 with the fanning device removed therefrom.

The invention can best be described by referring to FIG. 1 wherein a fanning device 10, constructed in accordance with a presently preferred form of the invention, is illustrated.

The device includes a generally elongated fan housing 12 which is connected to an outlet nozzle 14 by a throat section 15. The outlet nozzle 14 has an outlet opening 16 therein.

Referring to FIG. 2, it can be seen that the fan housing includes a laterally extending projection 24 having a generally circular or helical configuration so that a suitable centrifugal fan 28 can be rotatably supported by drive shaft 32 therein. The fan includes a downwardly and outwardly tapered conical section 36 which cooperates with a plurality of radially extending fan blades 40 to draw air inwardly through inlet opening 44 and expel it through outlet opening 16. To this extent, it should be noted that the axis of inlet opening 44 is coincident with the axis of rotation of the centrifugal fan 28. Additionally, the axis of the outlet nozzle 14 is at substantially right angles to the axis of rotation of the centrifugal fan so that air is expelled therefrom in a generally straight line. Although the fan may rotate at a relatively high velocity, the overall design is such as to result in a flow of air having a reduced velocity so that the coals to which the air flow is directed will not be blown out but rather, will be fanned to a greater temperature.

The fan housing 12 includes a lower wall 50 which supports and locates the housing 70 of a suitable electric motor 68. The motor carries an upwardly extending drive shaft 32 through the bearing 70 and into the centrifugal fan 28. The lower part of the motor is located in an opening 60 supported in a second wall 52. The motor 68 includes an upwardly and outwardly directed terminal plate 75 which is secured on the motor housing 74. The terminal plate 75 is restrained from rotating by a recess in wall 58 which descends from second wall 52 within battery housing 18. The motor has a lower, second terminal 76 for contact batteries as will be explained herein.

The battery housing 18 is a generally elongated cylindrical member integrally molded at one end to the fan housing adapted to support two dry cell batteries 86 and 88 in serial arrangement so that the central terminal of battery 86 is in contact with the second terminal 76 on the motor 68. The second battery 88 is electrically coupled to an electrical contact 92 by being in pressured contact with a helical spring 94 comprised of electrically conductive material that is supported by an electrically conductive disc 77. A portion of the periphery of disc 77 is in engagement with electrical contact 92. The spring tends to urge the batteries upwardly into engagement with the aforementioned second terminal 76. Fixed electrical contact 92 is held along the side of the battery housing by a suitable fastener such as a rivet.

The battery housing is also provided with a sliding electrical contact 100 which is controlled by an operating switch 102 which extends through an elongated opening 104 in the battery housing. The sliding electrical contact 100 has one end 108 which is in continuous contact with the fixed electrical contact 92 and slides therealong.

At its other end, sliding electrical contact 100 has a terminal contact 112 which is generally rounded and which is adapted to come into contact with terminal plate 75 of the motor 68. Thus, movement of operating switch 102 through the path defined by the elongated opening 104 will cause terminal contact 112 to make or break contact with plate 75 to selectively energize the centrifugal fan 28.

Batteries may be installed and removed from the battery housing through an opening in its bottom. To this extent the outer wall is provided with threads at its lower end that cooperate with the internal threads on the sidewalls of cap 110. The cap supports electrically conductive disc 77 and may also support spring 94. The device may be used by being hand held. However, means are provided for permitting it to be self-retaining on a barbecue pit. To this extent a suitable retainer 115 is mounted on the underside of throat 15 in generally facing relation to the battery housing 18. The retainer includes a laterally extending projection housing 116 that defines a recess 118 between its inner wall 119 and the battery housing 18.

Retainer 115 is used to advantage in a shallow barbecue pit of the type illustrated at 124 in FIG. 3. To this extent, recess 118, defined by retainer 115, receives the rim of the pit in a convenient manner. A suitable elongated metal conduit 128 has one end which is slidably received in outlet nozzle 14 for frictional engagement therewith. The other end 130 of conduit 128 is generally dish shaped and has an open top surface.

As is apparent when this arrangement is used in a shallow barbecue pit, conduit 128 is positioned so that dish 130 is at the center thereof. The charcoal or briquettes, preferably above the paper, are arranged so that they overlie dish 130. After the fire is ignited, as by igniting the paper, switch 102 can be actuated to cause the fan to drive air through outlet nozzle 14, conduit 128 and up to fan the briquettes. The fanning device 10 enables a fire to be started without liquid fuels in a few minutes.

Utilization of the fanning device 10 in cooperation with a deep barbecue pit 134 is illustrated in FIG. 5 and 6. In FIG. 6 a bracket 136 is fixedly secured adjacent a suitable opening 138. The bracket, which may be formed from a single rod, has its central portion welded or otherwise fastened to the sidewall of the pit 134. The upper portion of the bracket includes an outwardly extending loop 140 which can be adjusted by a suitable wingnut 142. The lower portion of the bracket, adjacent opening 138, includes an outwardly extending hooklike member 144 having a laterally extending member 146.

In FIG. 5 a fanning device 10 is shown installed in such a bracket and forming a handle for manipulating pit 134. To this extent it can be seen that the battery housing 18 is slipped through loop 140 and the wing nut 142 is tightened to constrain it in place. The retainer 115 cooperates with laterally extending member 146 so that outlet nozzle 14 is aligned with opening 138. Thus, when switch 102 is actuated, air is forced into the bottom of pit 134.

The fanning device can be laid on its side for fireplaces, campfires, etc., as well as used in barbecue pits.

While this invention has been described with reference to a particular embodiment thereof, it is apparent that many other forms and embodiments thereof will be obvious to those skilled in the art in view of the foregoing disclosure. Thus, the scope of the invention is defined in the appended claims.

I claim:

1. A battery-operated device for fanning a fire comprising a first housing, said housing including an inlet and an outlet, a fan supported by said housing for driving air through said outlet, a battery housing connected to said first housing, and a motor supported by one of said housings, said motor being positioned adjacent said first housing and being operably connected to said fan, switch means on said battery housing adapted to selectively couple said motor to batteries in the battery housing, said first housing and said battery housing are elongated members and are disposed at generally right angles with respect to each other, said first housing supporting a laterally extending projection that defines a recess intermediate said projection and said battery housing for receiving a portion of a barbecue pit, said recess is in generally facing relation to said battery housing, further including an elongated conduit, said conduit having one end connected to said outlet to form an extension of said first housing, and the other end of said conduit being substantially dish shaped.

2. A device as defined in claim 1 including a container having a sidewall, said sidewall including an opening therein, and a bracket fixed to said sidewall, said bracket supporting said first housing and said battery housing so that said outlet is received in said opening.

3. A device as defined in claim 2 wherein a portion of said bracket has an adjustable loop that cooperates with said battery housing to restrain it in position, and another portion of said bracket has a laterally extending bar that cooperates with said recess to hold said first housing in position so that said outlet is received in said opening.

4. A device as defined in claim 1 wherein the axis of rotation of said fan is substantially coincident with the longitudinal axis of said battery housing, said motor being fixed to said first housing and having a drive shaft extending therefrom to engage said fan.

5. A device as defined in claim 4 wherein said inlet is aligned with the axis of rotation of said fan, and said inlet is in communication with a throat that defines said outlet.

* * * * *